NEGATIVE IMPEDANCE REPEATERS HAVING GAIN CONTROLS

Filed June 9, 1958 2 Sheets-Sheet 1

INVENTOR.
ROBERT P. DIMMER

BY C. A. Gulbrandsen

ATTY.

INVENTOR.
ROBERT P. DIMMER
BY
C. A. Gullbrandsen
ATTY.

United States Patent Office 2,998,581
Patented Aug. 29, 1961

2,998,581

NEGATIVE IMPEDANCE REPEATERS HAVING GAIN CONTROLS

Robert P. Dimmer, Lombard, Ill., assignor to Automatic Electric Laboratories, Inc., a corporation of Delaware
Filed June 9, 1958, Ser. No. 740,806
3 Claims. (Cl. 333—80)

This invention relates to negative impedance repeaters having gain controls, to the converters used therein, and more particularly to such repeaters as used in telephone transmission lines.

The general object of this invention is to provide a negative impedance repeater which includes an arrangement permitting the gain to be easily adjusted.

Another object is to provide a combination series-shunt repeater in which the gain may be adjusted by the use of a single control.

Negative impedance repeaters and the converters used therein have been described in an article by J. G. Linvill published in the Proceedings of the I.R.E. for June, 1953, volume 41, pages 726–729; in Linvill, et al. United States Patent 2,726,370; and in patents and other publications cited in each of these. These repeaters each comprise a four-terminal negative impedance converter having one pair of terminals coupled in series or shunt of a line and a network connected to the other pair of terminals. The impedance of the network is reflected to the line with a negative conversion ratio. Frequently a series repeater and a shunt repeater are used together, since such a combination produces more gain and very little impedance irregularity on the line.

The greatest difficulty in the use of this type of repeater has been in the initial installation. The amount of negative impedance applied to the line with the prior repeaters has been determined by varying the impedance of the network, since the converter itself has had a constant conversion ratio between the network and the line. With junction transistors as active elements a converter may have a ratio of simply −1:1. Each different type of line requires a different network and the component values of each network must be changed for different gains. In a combination series-shunt repeater the two networks must be adjusted in conjunction with each other. The required network is obtained by strapping components together as required. In the usual case there are thousands of different values provided for the components to obtain different networks under different line conditions.

Negative impedance converters comprise active elements as amplifying devices having input, output and common connections; with vacuum tubes these connections usually being to the grid, plate and cathode respectively; and with transistors the connections being to the emitter, collector and base. In one form of push-pull converter employing two similar amplifying devices, one pair of terminals is connected respectively to the input connections of the amplifying devices and another pair of terminals is connected respectively to the output connections. Similar impedances are connected respectively between the common connections and a reference connection. The output connection of each amplifying device is coupled to the common connection of the other, thereby providing feedback. For an unbalanced converter a single amplifying device may be used, the second terminal of each pair being coupled to the reference connection. A phase inverting arrangement is then provided for deriving a signal which with respect to the reference connection is of opposite phase and proportional to the voltage at the output connection. The circuit point at which this voltage appears will for convenience be referred to as an image connection. It is coupled to the common connection of the amplifying device to provide the necessary feedback. In a balanced push-pull converter the image connection is the output connection of the opposite amplifying device. For a series repeater the terminals to the input connections are coupled in series with a line, and for a shunt repeater the terminals to the output connections are coupled in shunt of the line. In either case a terminating network is connected to the other pair of terminals.

According to the invention, a negative impedance converter having a variable conversion ratio is provided. In a circuit as described above, the coupling from the image connection to the common connection is provided by an impedance device connected from the image connection to a point along the common-to-reference connection impedance device, and a control arrangement is provided for varying the ratio of the value of the impedance between the said point and the reference connection to the value of the sum of the last-mentioned impedance plus the value of the impedance between said point and the image connection, so that the impedance presented by either pair of said terminals is negatively related to the impedance of the terminating network connected to the other pair of terminals by a factor which depends upon said ratio, and said factor may be varied by adjusting the setting of said control arrangement. In a push-pull balanced converter the two variable devices are ganged together to provide a single control. With a repeater using this variable ratio converter, the gain may be varied using a single control, with little or no strapping to handle all line conditions. A fixed terminating network may be used, at least for any general type of line.

The amplifying devices are preferably transistors with the emitter, collector, and base respectively as input, output and common connections.

In a preferred form of the invention, the impedance device from the image connection is connected to an adjustable tap of the common-to-reference connection impedance device. This may be provided by a switch having several positions and a pole per transistor, with the impedance from the common connection to the reference connection comprising a series of resistors connected between the fixed terminals of the switch, and with the adjustable tap being the moving contact or contacts of the switch.

Alternatively the variable arrangement may comprise an adjustable resistor connected between the image connection and the base connection, with a fixed resistor between the base connection and the reference connection.

Further according to the invention, a combination negative impedance repeater comprising two negative impedance converters as described above, preferably of the balanced push-pull type, one series connected and one shunt connected to the line, has the control devices of all the transistors ganged together to provide a single control.

The circuit parameters of the two converters of the combination and their terminating networks may be such that the ratio of the gain of the series repeater to the gain of the shunt repeater is substantially constant as the setting of the ganged control arrangement is varied.

The above-mentioned and other objects and features of this invention and the manner of attaining them will become more apparent, and the invention itself will be best understood, by reference to the following description of embodiments of the invention taken in conjunction with the accompanying drawings comprising FIGS. 1 to 7 wherein.

Figures 1, 2, 3, 4:
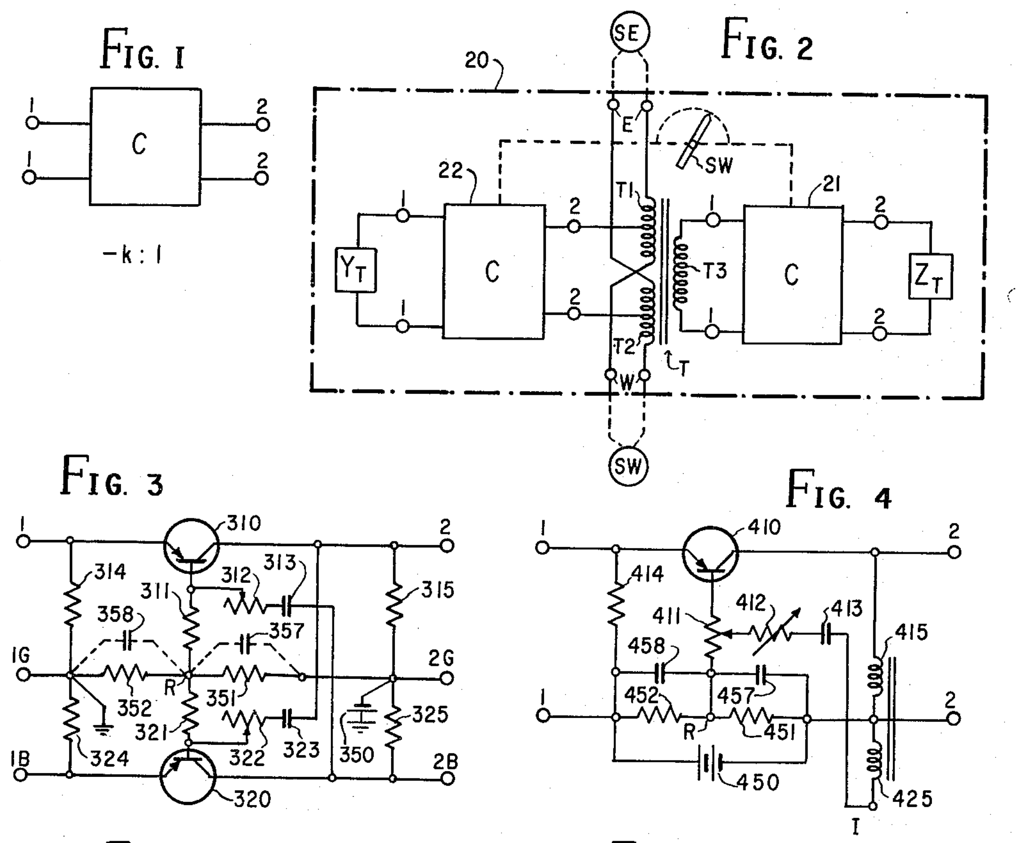
FIG. 1 shows a basic or ideal negative impedance converter.
FIG. 2 is a block diagram of a combination series-shunt repeater coupled to a telephone line.
Figure 7:
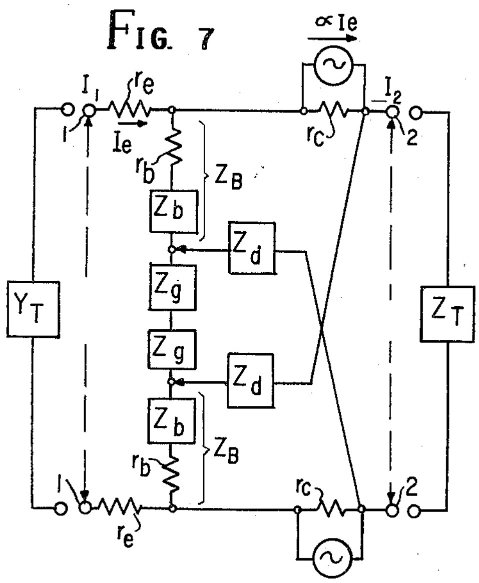
Figure 5:
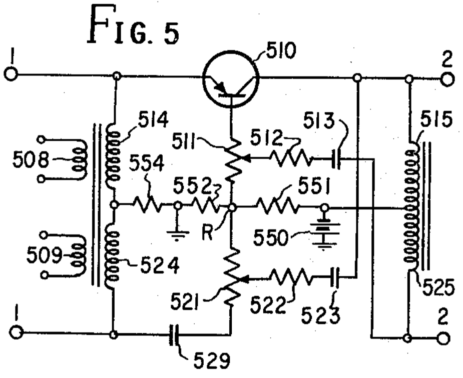
Figure 6:
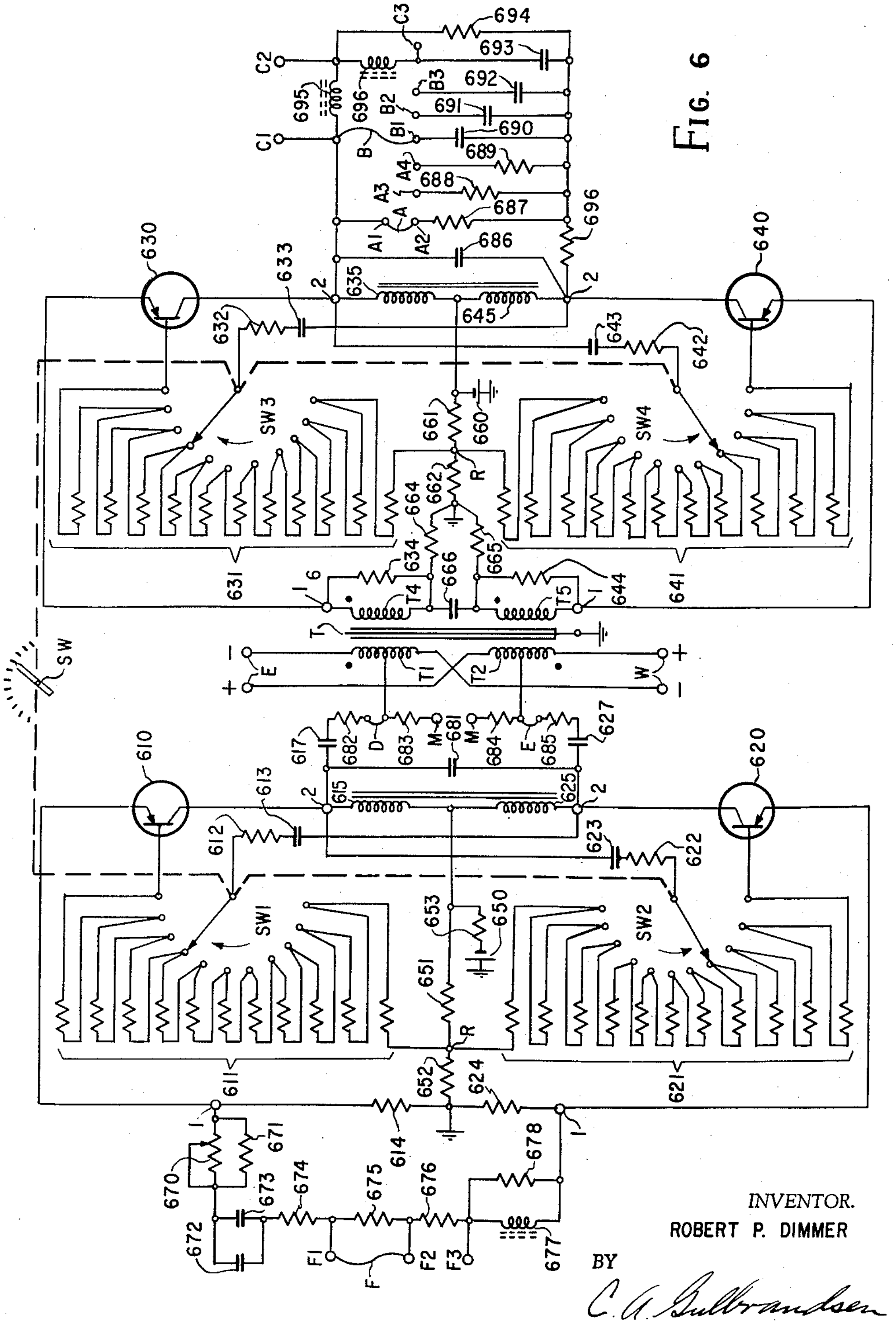

FIGS. 3 to 5 inclusive are schematic diagrams of different forms of negative impedance converters;

FIG. 6 is a schematic diagram of a combination series-shunt negative impedance repeater such as shown in FIG. 2; and FIG. 7 shows a simplified equivalent circuit of a push-pull converter.

The ideal negative impedance converter C presented in FIG. 1 is in the form of a transformer, but having a negative ratio of impedance transformation or conversion designated $-k:1$, as shown. The converter is open circuit stable at one pair of terminals 1—1, and short circuit stable at the other pair of terminals 2—2. The converter may be used as a series type repeater by coupling the terminals 1—1 in series with a line and a network to terminals 2—2, or as a shunt type repeater by coupling terminals 2—2 across the line and a network to terminals 1—1.

Usually, to achieve more gain, and to keep the impedance irregularity on the line to a minimum, a series repeater and a shunt repeater are used in combination. As a result of the fact that very little impedance irregularity is produced, echoes are reduced and the combination can be switched back to back with a carrier or a hybrid type repeater without difficulty.

FIG. 2 shows a series repeater and a shunt repeater in a single unit 20. One converter 21 has its terminals 1—1 coupled through transformer T in series with the line and a network $Z_T$ across its terminals 2—2. Another converter 22 has its terminals 2—2 connected in shunt across the line by having the terminals connected respectively to center taps of the primary windings T1 and T2 of transformer T, and has a network $Y_T$ connected to terminals 1—1. The combination unit 20 is connected into the telephone transmission line with the terminals E and terminals W connected respectively to adjacent sections. The line may be terminated, possibly through various switching and transmission networks, by respective telephone stations SE and SW. In accordance with the invention, to simplify installation and adjustment, the converters 21 and 22 are provided with a variable conversion ratio adjusted by a single switch control SW. The networks $Z_T$ and $Y_T$ are of fixed character and value corresponding to the general type of line, such as loaded cable.

FIG. 3 shows the invention applied to a common form of negative impedance converter employing two transistors 310 and 320. The biasing is supplied by two resistors 351 and 352 connected in series between the negative pole of a battery 350 and ground. The junction of these two resistors, which may be considered as being a reference connection R, is connected through the resistors 311 and 321 to the base connections of transistors 310 and 320 respectively. With PNP junction transistors, the emitter connections are connected respectively through resistors 314 and 324 to ground, and the collector connections are connected respectively through resistors 315 and 325 to the negative pole of the battery. Cross-coupling feedback is provided by the resistor 322 in series with the coupling condenser 323 connected from the collector connection of transistor 310 to the base connection of transistor 320, and a resistor 312 in series with a coupling condenser 313 connected between the collector connection of transistor 320 to the base connection of transistor 310. For a balanced push-pull converter the open circuit stable terminals 1—1B are connected to the respective emitter terminals, and the short circuit stable terminals 2—2B are connected to respective collector terminals. If an unbalanced converter having a grounded terminal is required the terminals 1G and 2G at A.C. ground potential may be provided, the four terminals then being 1—1G and 2—2G. It is then desirable to bypass the resistors 351 and 352 by condensers 357 and 358 respectively.

In the push-pull case, the cross-coupling feed-back network may be traced from the collector connection of transistor 310, through condensers 323, resistors 322, 321, 311 and 312 and condenser 313 to the collector connection of transistor 320. The conversion ratio of the converter depends upon the portion of the voltage across this network which is applied to the base connections, and thence through the low internal emitter-base impedance of the transistors to the emitter connections. According to the invention, an adjustment arrangement is provided in the impedance devices of the cross-coupling network to provide a control for varying the conversion ratio. One possible adjustment arrangement, shown in FIG. 3, is to make the resistors 312 and 322 adjustable.

In the unbalanced case transistor 320 acts as a phase inverter. A portion of the voltage at the collector connection of transistor 310 is applied to the base connection of transistor 320 and produces a voltage of opposite phase at the collector connection of transistor 320. The collector connection of transistor 320 may be considered as an image connection since with respect to the reference connection, or A.C. ground, its voltage is of opposite phase and proportional to the voltage at the collector connection at transistor 310. A voltage proportional to the voltage at this image connection is applied to the base connection of transistor 310. The feedback is adjusted to provide a variable conversion ratio as in the push-pull case. In the push-pull converter, each collector connection may be considered as the image connection for the other transistor.

FIG. 4 shows another form of unbalanced converter, in which a transistor 410 has associated circuit elements and functions in substantially the same manner as transistor 310 in FIG. 3. The collector bias resistor 315 is replaced by a choke winding 415, and a second winding 425 is wound on the same core. These windings act as a transformer to provide the phase inversion, the lower end of winding 425 being the image connection at which the voltage is of opposite phase and proportional to the voltage at the collector connection of transistor 410 with respect to the reference connection or A.C. ground. The feedback network includes the resistor 411 between the base connection and the reference connection, and a resistor 412 and coupling condenser 413 between the image connection and a tap of resistor 411. The control of the conversion ratio is provided by the adjustable tap of resistor 411. Resistor 412 may also be adjustable.

FIG. 5 shows another form of converter employing a single transistor 510. Bias is provided by resistors 551 and 552 connected between the negative terminal of battery 550 and ground with a reference connection at their junction, and a resistor 511 between the base connection and the reference connection, as in FIGS. 3 and 4. The emitter terminal is connected through choke winding 514 and resistor 554 to ground, and the collector connection is connected through choke winding 515 to the negative pole of the battery. The image connection is provided at the lower end of a winding 525 on the same core with winding 515, and this image connection is coupled through the condenser 513 and resistor 512 to an adjustable tap of resistor 511 as in FIG. 4. A second winding 524 is provided on the same core with winding 514, and the open circuit stable terminals 1—1 are connected, one to the emitter terminal and the other to the lower end of winding 524. The resistors 521 and 522 along with coupling condensers 523 and 529 provide a circuit for coupling a portion of the voltage at the collector connection to the lower end of winding 524. The conversion ratio of the converter is adjusted by the adjustable taps of resistors 511 and 521. The transformer action provided by the mutual coupling between windings 514 and 524 aids in the operation of this converter circuit. For a series type repeater, it is preferable to couple the converter to the line through primary windings 508 and 509 on the same core with these windings.

FIG. 6 is a schematic diagram of an exemplary embodiment of a combination series shunt repeater as shown by the unit 20 in the block diagram of FIG. 2. The converter 21 of the series repeater comprises transistors 630 and 640. The biasing arrangement includes resistors 661 and 662 connected between the negative pole of battery 660 and ground, with a reference connection R at their junction. The collector connections of the transistors are connected to the negative pole of the battery through the respective windings 635 and 645 on a common core. The emitter connections are connected to ground through respective resistors 664 and 665 in series respectively with windings T4 and T5 which are shunted by respective resistors 634 and 644. A bypass condenser 666 is connected between the windings T4 and T5. The cross-coupling network comprises resistances 631 and 641 connected respectively between the reference connection and the base connections of transistors 630 and 640, a resistor 632 and coupling condenser 633 connected from the collector connection of transistor 640 to an adjustable tap of resistance 631, and a resistor 642 and coupling condenser 643 connected from the collector connection of transistor 630 to an adjustable tap of resistance 641. The network $Z_T$ comprises the components 686 to 696 connected between the terminals 2—2. The converter is coupled in series with the line by transformer T having windings T1 and T2 in the respective line conductors as shown in FIG. 2, and with the two windings T4 and T5 between the terminals 1—1 in place of the single winding T3 shown in FIG. 2.

The converter 22 of the shunt repeater comprises transistors 610 and 620. The biasing arrangement includes resistors 653, 651 and 652 in series between the negative pole of battery 650 and ground, with a reference connection at the junction of resistors 651 and 652. The collector connections are connected respectively to the junction of resistors 651 and 653 through the windings 615 and 625 wound on a single core. The emitter connections are connected to ground through resistors 614 and 624 respectively. The cross-coupling network comprises resistors 611 and 621 connected respectively between the reference connection and the base connections of transistors 610 and 620, a resistor 612 and coupling condenser 613 connected from the collector connection of transistor 620 to an adjustable tap of resistance 611, and a resistor 622 and coupling condenser 623 connected from the collector connection of transistor 610 to an adjustable tap of resistor 621. The network $Y_T$ comprises the components 670 to 678 connected between the terminals 1—1. The terminals 2—2 are shunted by a condenser 681 and are connected to the respective center taps of windings T1 and T2 of the transformer T through the respective coupling condensers 617 and 627 in series respectively with resistors 682 and 685. A monitor may be plugged to jacks (or terminals) M—M, which are connected through resistors 683 and 684 to the respective center taps of windings T1 and T2.

A single 11-position 4-pole switch SW is used to control the conversion ratios of the two converters, to thereby control the gain of the combination repeater. To each pole of the switch, ten resistors are connected in series between adjacent fixed contacts, and an eleventh resistor is connected between an end fixed contact and the reference connection. These resistors form resistance 611 on pole SW1, resistance 621 on pole SW2, resistance 631 on pole SW3, and resistance 641 on pole SW4. The moving contact of each pole forms an adjustable tap point. With this arrangement the two transistors of each converter may be maintained in balance, and the gain contributed by each of the two repeaters relative to the total gain may be kept in a fixed proportion.

The combination repeater is installed by connecting the terminals E and W to the line. The networks in the unit may be of a fixed character in accordance with the general type of line. For example, for loaded cable having a 0.5 end section the strap B is connected to terminal B1. The desired relative gains are obtained in the series repeater by strapping the A terminals as required, and in the shunt repeater by strapping the F terminals and adjusting resistor 670 as required. For non-loaded cable the terminals C1, C2, and C3 are strapped together to shunt out the inductors 695 and 696 in the series repeater and the shunt repeater is disconnected by removing straps D and E.

In FIGS. 3, 4, 5 and 6, different embodiments of the cross-coupling circuits and the adjustment arrangements therein are shown in the various converter circuits for convenience, and it is clear that each such arrangement may be used in any of the other converter circuits. It is also clear that the bias arrangements shown may be used in any of the circuits. For example, the direct current to each transistor connection may be supplied through either a resistor or an inductor.

An ideal negative impedance converter has a negative ratio of impedance transformation or conversion designated $-k:1$, as shown in FIG. 1. If used as a series repeater with a positive impedance $Z_N$ connected to terminals 2—2, $-kZ_N$ is seen at terminals 1—1. If used as a shunt repeater with an impedance $Z_N$ connected to terminals 1—1, $Z_N/-k$ is seen at terminals 2—2; or designating the terminating network as an admittance $Y_N$, the reflected admittance is $-kY_N$. The value of $k$ for the push-pull transistor converters shown in FIGS. 3 and 6 may be determined by reference to the equivalent circuit shown in FIG. 7. For a series repeater, the network $Z_T$ is connected to terminals 2—2, and the impedance $Z_N$ comprises $Z_T$ shunted by $2(Z_d+Z_g)$. The reflected impedance at terminals 1—1 connected in series with a line is $E_1/I_1$. For a shunt repeater, the network $Y_T$ is connected to terminals 1—1, and the admittance $Y_N$ includes $Y_T$ and $2r_e$. The reflected admittance at terminals 2—2 connected in shunt of a line is $I_2/E_2$. The circuit includes an external impedance $Z_b$ added in series to the base resistance $r_b$ to give a total base impedance $Z_B$. This, in conjunction with the impedances $Z_d$ and $Z_g$, comprises the cross-coupling network. Analysis shows that for both the series and shunt cases, the conversion factor is approximately:

$$k=\frac{Z_g}{Z_g+Z_d}$$

The deviations from this value are of a different nature for the two cases. The neglected terms include in both cases those having the factor $(1-)$, in the series case the emitter resistance term $2r_e$, and in the shunt case a term which is the reciprocal of $2(Z_d+Z_g)$.

In a specific design of the unit shown in FIG. 6, the transistors may each be type 2N44 or equivalent. The transformer T is a telephone type repeat coil. The direct-current source shown as batteries 650 and 660 is the 48-volt telephone exchange battery. The ten resistors connected between the fixed contacts of each pole of switch SW may have a value of about 100 to 120 ohms, and the eleventh resistor connected between the end fixed contact and the reference connection may have a value of about 1500 ohms. The remaining components may have values as follows:

*Resistors*

| | Ohms | | Ohms |
|---|---|---|---|
| 612 | 12,000 | 670 | 500 |
| 614 | 2,200 | 671 | 500 |
| 622 | 12,000 | 674 | 500 |
| 624 | 2,200 | 675 | 100 |
| 632 | 15,000 | 676 | 10 |
| 634 | 1,500 | 678 | 62 |
| 642 | 15,000 | 682 | 2,200 |
| 644 | 1,500 | 683 | 20,000 |
| 651 | 10,000 | 684 | 20,000 |
| 652 | 10,000 | 685 | 2,200 |
| 653 | 3,300 | 687 | 50,000 |
| 661 | 10,000 | 688 | 100,000 |
| 662 | 10,000 | 689 | 200,000 |
| 664 | 2,200 | 694 | 10,000 |
| 665 | 2,200 | 696 | 2,000 |

*Capacitors*

| | Microfarads | | Microfarads |
|---|---|---|---|
| 613 | 0.5 | 673 | 2 |
| 617 | 1 | 681 | 0.0006 |
| 623 | 0.5 | 686 | 0.003 |
| 627 | 1 | 690 | 0.005 |
| 633 | 0.5 | 691 | 0.002 |
| 643 | 0.5 | 692 | 0.001 |
| 666 | 1.5 | 693 | 0.0025 |
| 672 | 0.5 | | |

*Inductors*

| | Henries | | |
|---|---|---|---|
| 615 | 18 | 677, millihenries | 20 |
| 625 | 18 | 695 henries | 0.73 |
| 635 | 8.0 | 696 do | 0.45 |
| 645 | 8.0 | | |

During installation, the series unit is adjusted by connecting strapping A from terminal A1 to the terminals A2, A3, and/or A4 to obtain a gain of 6.5 db at 1400 c.p.s. with the shunt unit disconnected. The shunt unit is adjusted by adjusting resistor 670 for a gain of 9.8 db at 1,000 c.p.s. with the series unit connected. The strap F is initially connected from terminal F1 to terminal F2; for −0.2 db gain, this strap may be removed; and for +0.2 db gain, this strap may be connected from terminal F1 to terminal F3.

The specific design given is for loaded cable of the H88 type, which has an 88 millihenry loading coil every 6,000 feet. The repeater will usually face a 0.5 section of cable, that is, it will be 3,000 feet from the first loading coil. However, the repeater will handle any type of section by connecting strapping B as indicated in the following table.

| End section: | Strapping B to terminals |
|---|---|
| 0.5 | B1 |
| 0.6 | B1, B3 |
| 0.7 | B1, B2 |
| 0.8*n* | B1, B2, B3 |

When the repeater is used with non-loading cable, the terminals C1, C2, and C3, may be strapped together to short out the inductors 695 and 696, and strapping B may be connected to the terminals B1, B2 and/or B3 depending on line conditions. The shunt repeater should be disconnected by removing the straps D and E.

With any type of transmission line, after the networks are strapped and adjusted as indicated above, the switch SW may be set to a position which yields the desired gain for the combination unit.

While I have described above the principles of my invention in connection with specific apparatus, it is to be clearly understood that this description is made only by way of example and not as a limitation to the scope of my invention.

What is claimed is:

1. A negative impedance repeater comprising two negative impedance converters, each of which is a balanced push-pull negative impedance converter which comprises a pair of like transistors, each of which has a semiconductive body and emitter, base and collector connections to said body, means including an electric energy source connected for biasing said emitters in a forward direction and said collectors in a reverse direction, a reference connection, first impedance means interconnecting the base connection of each transistor with the reference connection, second impedance means interconnecting a point along said first impedance means with the collector connection of the other transistor, a first pair of terminals connected respectively to the emitter connections of said transistors, a first terminating network interconnecting said first pair of terminals, a second pair of terminals connected respectively to the collector connections of said transistors, a second terminating network interconnecting said second pair of terminals, a control arrangement for varying the ratio of the value of the impedance between each said point and the reference connection to the value of the sum of the last-mentioned impedance plus the value of the impedance between said point and the opposite collector connection, whereby the impedance presented by either pair of said terminals is negatively related to the impedance of the terminating network connected to the other pair of terminals by a factor which depends upon said ratio, and said factor may be varied by adjusting the setting of said control arrangement; one of said converters having its first pair of terminals coupled in series with a two-conductor line and the other said converter having its second pair of terminals connected in shunt across said line, and said control arrangements of the two converters together comprise variable impedance means having four separate adjustable sections ganged to a single manual control, with the sections individually associated with the respective transistors, each section being connected in the circuit between the base connection of its associated transistor and the collector connection of the other transistor of the same converter.

2. A negative impedance repeater according to claim 1, wherein the circuit parameters of the said two converters and their terminating networks are such that the ratio of the gain of the series repeater to the gain of the shunt repeater is substantially constant as the setting of the ganged control arrangement is varied.

3. A negative impedance repeater according to claim 2, wherein the said four adjustable sections of said variable impedance means are four separate poles of a switch having a plurality of positions, with each pole having one moving contact and a fixed contact per position, the said first impedance means comprising a plurality of resistors connected between the reference point and successive ones of said fixed contacts of the corresponding pole, the said points being the moving contacts, and said second impedance means includes a resistor connected in circuit between the moving contact and the collector connection of the other transistor of the same converter.

References Cited in the file of this patent

UNITED STATES PATENTS

| | | |
|---|---|---|
| 2,726,370 | Linvill | Dec. 6, 1955 |
| 2,745,068 | Gannett | May 8, 1956 |
| 2,844,669 | Arndt | July 22, 1958 |